June 1, 1954
A. E. DU BOIS
2,679,709
SOAP HOLDER
Filed July 11, 1949
3 Sheets-Sheet 1
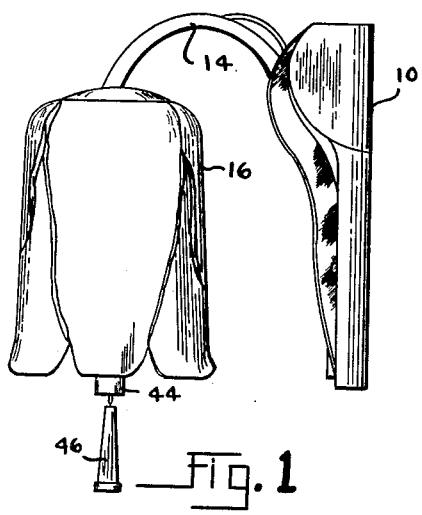
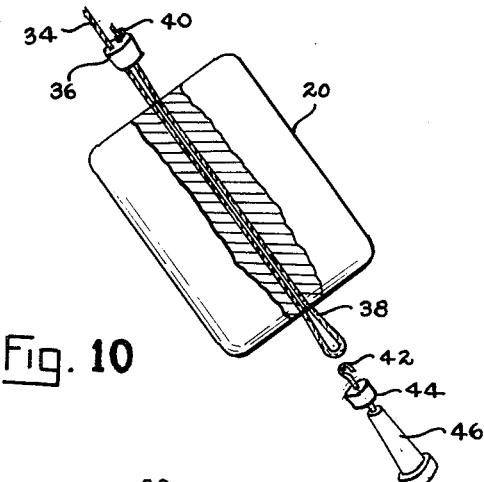
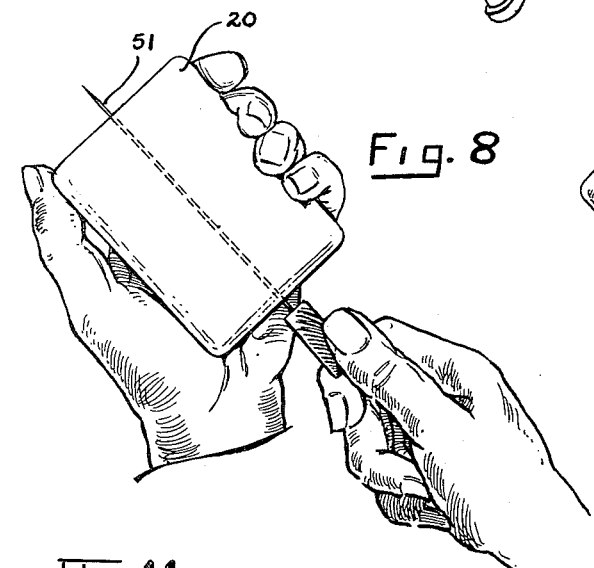
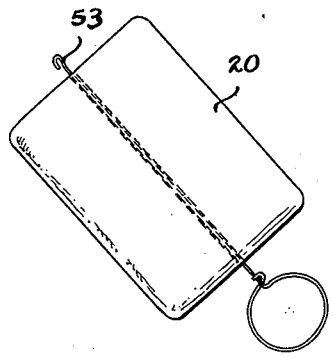
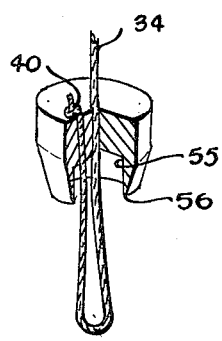
INVENTOR
ARTHUR E. DUBOIS
BY
Toulmin & Toulmin
ATTORNEYS

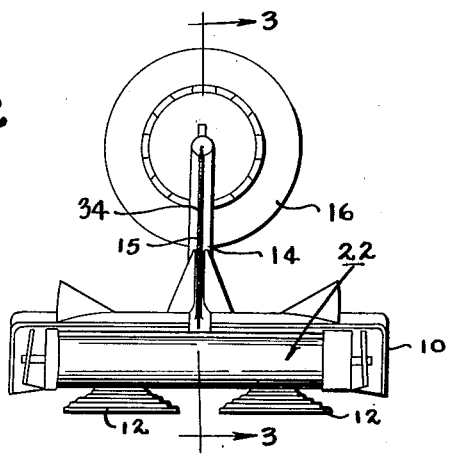
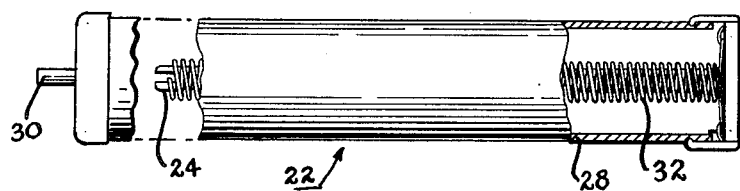
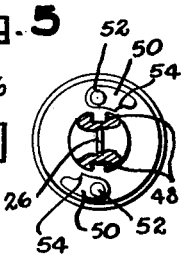
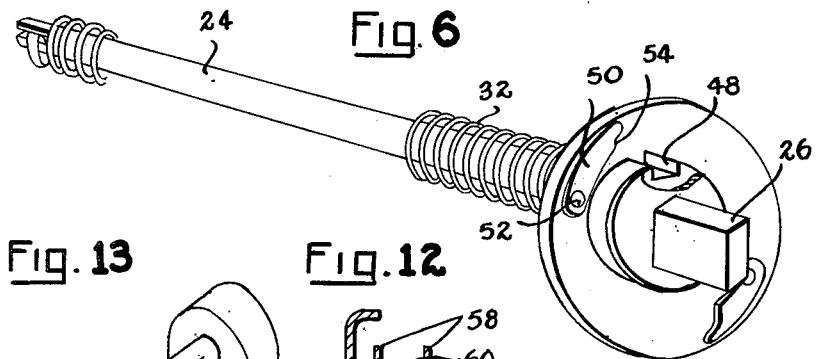
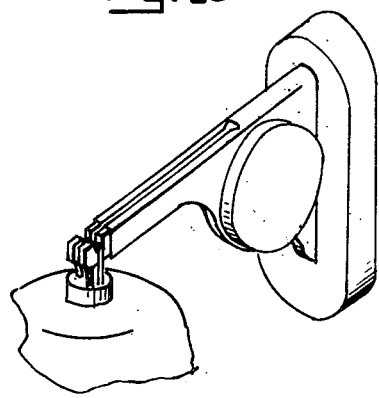
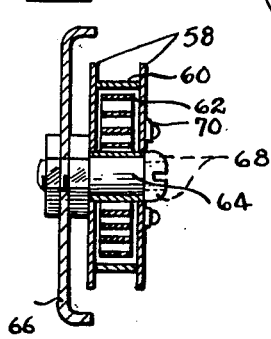
INVENTOR
ARTHUR E. DUBOIS
BY
Toulmin & Toulmin
ATTORNEYS June 1, 1954  A. E. DU BOIS  2,679,709
SOAP HOLDER
Filed July 11, 1949  3 Sheets-Sheet 3
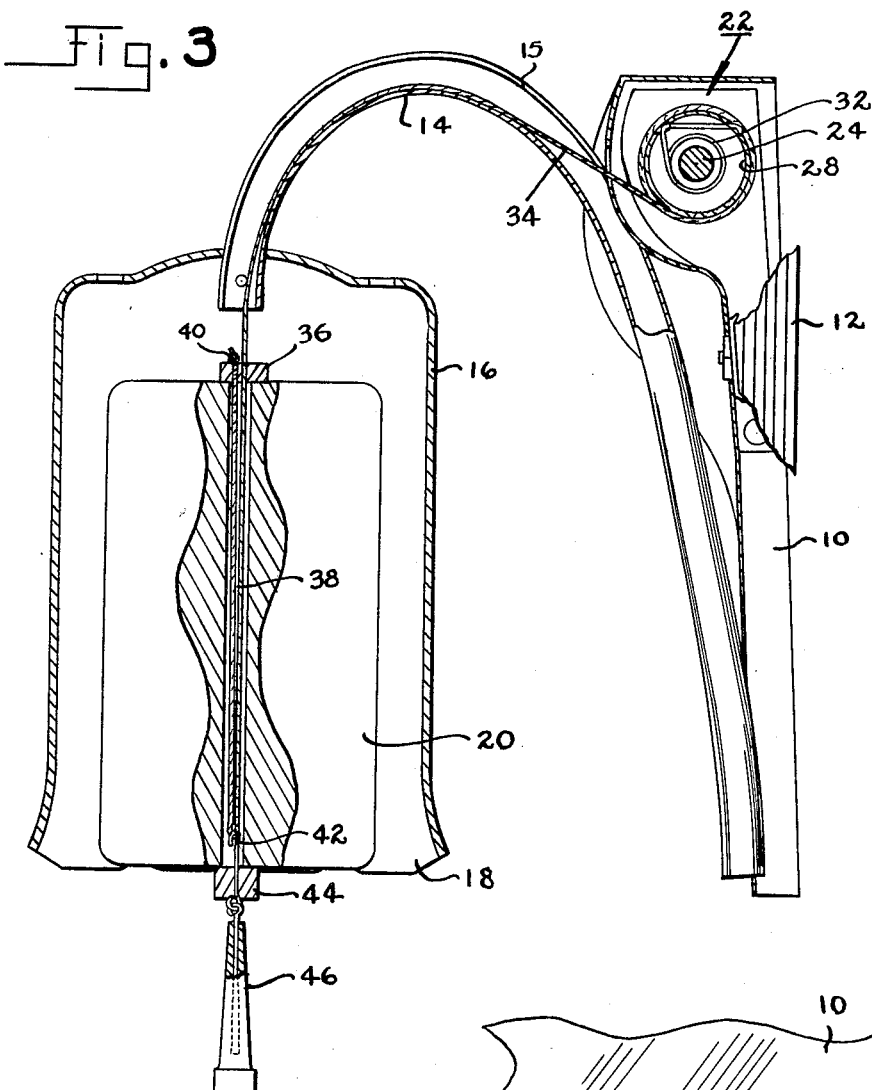
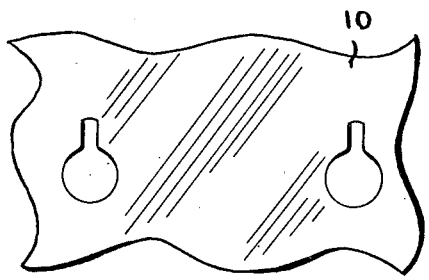
INVENTOR
ARTHUR E. DUBOIS
BY
Toulmin & Toulmin
ATTORNEYS Patented June 1, 1954

2,679,709

UNITED STATES PATENT OFFICE 2,679,709

SOAP HOLDER

Arthur E. Du Bois, Fort Lauderdale, Fla.

Application July 11, 1949, Serial No. 104,086

7 Claims. (Cl. 45—28)

This invention relates to a method of and a device for supporting and dispensing articles. In particular, this invention relates to a method of and a device for supporting an article, such as a tool, implement, soap, or the like, in such a manner that when not in use the article is supported in a convenient position, and when in use, can be drawn from the support to a position where it is to be used.

The particular example of my invention which is illustrated and described in this application is that of a support for a bar of soap, but it will be understood as the description proceeds that this invention is by no means limited to this particular employment of it, but is to be considered as useful in connection with other articles, such as garage tools, dentists' implements, etc.

The particular object of this invention is the provision of a support for an article such that the article is normally supported by the device in a conveniently accessible position but may at any time be drawn therefrom for use to any predetermined extended position.

Another object of this invention is to provide a supporting device of the nature described which will provide an enclosure for the supported article when not in use.

Another object is to provide a method of and a device for supporting articles such that they do not become lost and are readily accessible at all times for use.

A particular object of this invention is the provision of a dispensing support for a bar of soap or the like and which always provides adequate support for the bar of soap, even when a considerable amount of it has been used.

Another object is the provision of a dispensing support for a bar of soap such that the soap is always dry and clean and which eliminates the need of soap dishes and the like.

These and other objects and advantages will become more apparent upon reference to the following description taken in connection with the accompanying drawings, in which:

Figure 1 is a side elevational view showing a dispensing support constructed according to my invention especially adapted for supporting bars of soap;

Figure 2 is a plan view of the device looking down from the top of Figure 1;

Figure 3 is a vertical section through the device and is indicated by the line 3—3 on Figure 2;

Figures 4 and 5 are detailed views showing the construction of the dispensing reel mounted in the device;

Figure 6 is a perspective view showing other details in connection with the dispensing reel;

Figure 7 is a view looking in at the rear of the frame of the device and showing the keyhole shaped apertures therein for detachably receiving the supporting members for the device;

Figures 8, 9, and 10 are a series of views showing the manner of threading the supporting cord of the device through a bar of soap;

Figure 11 is a perspective view partly in section showing details in connection with one of the beads which surround the supporting cord and engage one end of the bar of soap;

Figure 12 is a vertical section showing a modified form of reel; and

Figure 13 is a perspective view showing a dispensing support according to my invention embodying the reel illustrated in Figure 12.

Referring to the drawings, and particularly to Figures 1 through 6, my invention consists of a frame member 10 which may be of any suitable configuration and which is adapted for being supported on a wall or other suitable member, as by means of the suction cups 12 secured to the back of the said frame. The frame may be, as shown, decorative, in order to simulate a flower, lighting fixture, or the like, or may be plain, as individual preferences indicate.

The frame 10 has projecting therefrom an arcuate tube 14 and secured to the outer end of tube 14 so as to hang downwardly therefrom is a housing part 16 open at the bottom, as indicated by reference numeral 18 in Figure 3. The housing part forms a receptacle for receiving the article that is supported by the device of this invention and may be of any size or shape necessary. The particular housing shown in the drawings is cylindrical and is adapted for receiving the bar of soap 20.

Mounted in frame 10 and extending transversely thereacross is a reel, generally indicated at 22, and which comprises the center shaft part 24 having the flattened end 26 receivable in a slot in one side of frame 10. The reel also includes an outer part 28, and this has a round shaft projection 30 at the end opposite the flat shaft 26. The shaft 30 is receivable in a round aperture in the side of frame 10 opposite the slot which receives flattened shaft 26 so the outer part of the reel is rotatably supported in the frame, while shaft 24 is stationarily supported by its flattened part 26.

A torsion spring 32 has one end connected with shaft 24 and its other end connected with the rotatable part of the reel so the reel is continuously biased thereby in one direction.

Spring 32 is selected so as to have sufficient strength not only to support the article with which the device is to be used, but also to draw the article into housing 16, as will be seen hereinafter.

A flexible member, such as the cord 34, has one end connected to the rotatable part 28 of the reel and then extends through tube 14 and into the interior of housing 16. For convenience of threading cord 34 into the device, tube 14 may be slotted along its upper side, as at 15. The cord 34 is for attachment to the article to be supported and may have any suitable means at its free end for effecting this attachment. In the case of a bar of soap, the cord 34 is led through a bead 36 to form a loop 38, and then comes back through the bead and is knotted, as at 40. The loop 38 extends through the bar of soap, as shown in Figure 3, near the bottom end of the bar of soap engages a metallic hook 42 which also leads through a bead 44 beneath the bar of soap and is secured to a pull member 46.

At this time it will be evident that the bar of soap 20 can be drawn from housing 16 merely by grasping the pull member 46 and drawing it downwardly. The distance which the soap can be drawn from the housing will be determined by the nature of the reel in the housing and the length of cord 34, and it will be apparent that these can be adjusted to give any desired extension of the soap from the housing. For example, the device can be mounted on the wall adjacent a shower and the soap will be readily available to any bather taking a shower. At the same time, the cord can be of sufficient length and the reel of such a nature that the soap can be pulled from the device far enough to accommodate a tub bather.

Returning now to Figures 4, 5, and 6, it will be seen that shaft 24 adjacent its flattened part 26 has a member thereon embodying notches 48. Mounted on the rotatable part of the reel adjacent the member having the notches 48 are a pair of latch arms 50 pivoted as at 52 and having latching ledges 54. The ledges 54 face in such a direction that when the reel is rotated by spring 32 the said ledges will engage the one side of the upper of notches 48 and provide a stop for the said reel. However, if the reel is rotated by spring 32 at greater than a predetermined speed, the members 50 will be held outwardly and thus will not engage notches 48.

Thus, if the article within housing 16 is drawn to a predetermined point and then the reel is allowed slowly to back up under the influence of its spring, one of members 50 will engage one of notches 48 and halt the reel. However, if the article is thereafter pulled out until the said member 50 is disengaged from the said notch 48 and then is allowed to move rather quickly toward housing 16, members 50 will be held outwardly and permit spring 32 to cause the reel to wind up cord 34 until the article is again positioned within the housing.

The manner of threading the cord 34 through a bar of soap is illustrated in Figures 8 through 10. Figure 8 shows how a bar of soap can have a pointed skewer-like member 51 thrust through to provide a bore for receiving the said cord. This skewer member may be wet, if desired, in order to facilitate pushing it through the bar of soap.

After the bore has been provided in the bar of soap by the skewer-like member, a tool 53 having a hook is pushed through the bore. Then, the loop 38 is engaged by the hook on the tool 53 and drawn completely through the bar of soap, as indicated in Figure 10. The pull 46 is then engaged with the loop 38 by means of hook 42, and the part of cord 34 leading to the reel is pulled up so the beads 36 and 44 are drawn tightly against opposite faces of the bar of soap, as illustrated in Figure 3. It will be evident that this provides a very simple and ready means for threading the bar of soap and for retaining it tightly in position on the cord 34.

An advantage of the loop arrangement as described is that as the soap wears away, the loop will be automatically tightened each time the bar of soap is drawn outwardly by pulling on pull member 46.

In order to eliminate cutting of the soap by the cord extending therethrough, especially when the soap is wet, one or both of the beads 36 and 44 may be made as shown in Figure 11, wherein the bead is hollowed out, as indicated at 55, on its side adjacent the soap and has a rather sharp edge 56 which will bite into the surface of the soap and give an area of contact therewith which will prevent the cord from being pulled into cutting relationship with the soap.

Another form which the reel of my invention may take is illustrated in Figure 12, and it will be seen in this view that the reel is substantially shortened over what is illustrated in Figures 2 and 4. This enables the reel to be mounted in considerably less space and permits the supporting device to be made correspondingly narrower from side to side. In Figure 12 the reel comprises the side plates 58 and the part 60 secured therebetween which forms with the said side plates a trough for receiving the cord 34. Between the side plates and inside member 60 is a torsion spring 62 suitably anchored at one end to side plates 58 or to member 60, and at its other end to stationary shaft 64 that is clamped to part 66. Shaft 64 has notches 68 therein which cooperate with stop members 70 so the operation of the reel is the same as was described in connection with the reel of Figure 4.

A device embodying the reel of Figure 12 is shown in Figure 13, and it will be seen to comprise substantially the same elements as were described in connection with the first modification, except that a slightly different arrangement is made due to the shortness of the reel.

In connection with the use of my device for supporting bars of soap, a number of advantages obtain. For example, a certain degree of safety is achieved because in taking a shower the wet bar of soap never gets underfoot, but is always supported off the floor and even if dropped remains in extended position or will be drawn back into the housing.

Furthermore, the arrangement for supporting the soap is such that there is no danger of anyone being injured by any of the hooks or other metal devices such as screws or clamps, as appear in some of the prior art devices. Even if the bar of soap becomes broken, there is no chance of anyone becoming injured.

The soap supported in a device according to my invention is always clean and dry and messy soap dishes and similar containers are entirely eliminated.

The device is pleasing in appearance and occupies a small amount of space and represents an economy of installation over the usual soap dishes which are found in most bathrooms and showers.

Due to the fact that the soap is always clean and dry and never lays in a wet dish, a definite saving of soap results, because the soap dries out as soon as possible after use.

It will be evident from the foregoing description that while this invention is shown and described for use as a soap holder, it is by no means limited to that particular instance, but could be highly useful in dentists' offices, for example, for supporting dentists' tools, in garages, for supporting mechanics' tools, and in many other similar circumstances.

It will be understood that this invention is susceptible to modification in order to adapt it to different usages and conditions, and, accordingly, it is desired to comprehend such modifications within this invention as may fall within the scope of the appended claims.

I claim:

1. In a device of the character described; a frame adapted for mounting on a vertical wall, a reel enclosed within the frame, a flexible element wound about the reel and having one end secured to the reel and its other end leading therefrom, a spring biasing the reel in a direction to wind up the element thereon, an arm extending outwardly from the frame, an open ended housing supported on the outer end of the arm open end down, in horizontally spaced relation with said frame, said element leading through said arm into the housing at the closed end thereof, means on the said other end of the element for attachment to an article to be supported by said device, said housing being of a size to enclose the supported article when retracted therein, and detent means for the reel selectively engageable therewith or disengageable therefrom for retaining said reel in a plurality of positions with the article extended from said housing or located therein.

2. In a device of the character described; a frame adapted for mounting on a vertical wall, a reel enclosed within the frame, a flexible element wound about the reel and having one end secured to the reel and its other end leading therefrom, a spring biasing the reel in a direction to wind up the element thereon, a housing open at the bottom, an arm extending from the closed end of the housing to the frame to support the housing in horizontally spaced relation with said frame, the said other end of the element leading along said arm and into the housing at the closed end thereof, and means at the said other end of the element for detachable connection with an article to be supported by the device, said housing being of a size to enclose the article when retracted therein.

3. In a device of the character described; a frame adapted for mounting on a vertical wall, a reel enclosed within the frame, a flexible element wound about the reel and having one end secured to the reel and its other end leading therefrom, a spring biasing the reel in a direction to wind up the element thereon, a housing horizontally spaced from the frame open at the bottom, a hollow arm extending from the closed end of the housing to the frame to support the housing on the frame, the said other end of the element leading through said arm and into the housing at the closed end thereof, and means at the said other end of the element for detachable connection with an article to be supported by the device, said arm being slotted along the top from the housing to the frame to facilitate threading of the element therethrough, said housing being of a size to enclose the supported article when retracted therein.

4. In a device of the type described including a cord leading from the device; a loop in the end of the cord for being passed through a bar of soap, and a pull member having a hook thereon to engage the end of the loop to retain the soap on the cord and to provide graspable means for pulling the soap outwardly from the device.

5. In a device of the type described including a cord leading from the device; a bead or collar through which the cord slidably extends, said cord having its end extended back through the bead and secured thereto thus providing an extensible loop for passing through a bar of soap, and a pull member having a hook thereon to engage the end of the loop to retain the soap on the cord and to provide graspable means for pulling the soap outwardly from the device.

6. In a device of the type described including a cord leading from the device; a bead or collar through which the cord slidably extends, said cord having its end extended back through the bead and secured thereto, thus providing an extensible loop for passing through a bar of soap, and a pull member having a hook thereon to engage the end of the loop to retain the soap on the cord and to provide graspable means for pulling the soap outwardly from the device, said pull member also having a bead or collar thereon, said beads engaging opposite sides of the bar of soap.

7. In a device of the type described including a housing and a cord leading from the housing; a bead or collar through which the cord slidably extends, said cord having its end extended back through the bead and secured thereto, thus providing an extensible loop for passing through a bar of soap, and a pull member having a hook thereon to engage the end of the loop to retain the soap on the cord and to provide grasping means for pulling the soap from the housing, said pull member also having a bead or collar thereon, said beads engaging opposite sides of the bar of soap, and at least one of said beads being hollow on its soap engaging side for biting into the soap to support the cord so it will not cut the soap.

References Cited in the file of this patent

UNITED STATES PATENTS

| Number | Name | Date |
|---|---|---|
| 508,809 | Breul | Nov. 14, 1893 |
| 706,992 | Neamann | Aug. 12, 1902 |
| 847,279 | Cox | Mar. 12, 1907 |
| 869,124 | Alt | Oct. 22, 1907 |
| 1,145,606 | Meyers | July 6, 1915 |
| 1,342,844 | Davis | June 8, 1920 |
| 1,350,784 | Colburn | Aug. 24, 1920 |
| 2,182,293 | Hokerk | Dec. 5, 1939 |
| 2,243,634 | Kadish | May 27, 1941 |
| 2,439,238 | Collins | Apr. 6, 1948 |

FOREIGN PATENTS

| Number | Country | Date |
|---|---|---|
| 4,412 | Great Britain | 1902 |
| 13,757 | Great Britain | 1910 |
| 44,284 | Sweden | July 17, 1918 |